United States Patent
Zeng (10) Patent No.: US 10,825,150 B2
(45) Date of Patent: Nov. 3, 2020

(54) IMAGE PROCESSING METHOD AND DEVICE, ELECTRONIC DEVICE AND COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Yuanqing Zeng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 70 days.

(21) Appl. No.: 16/142,272

(22) Filed: Sep. 26, 2018

(65) Prior Publication Data

US 2019/0130538 A1 May 2, 2019

(30) Foreign Application Priority Data

Oct. 31, 2017 (CN) .......................... 2017 1 1045673

(51) Int. Cl.
*G06T 5/00* (2006.01)
*G06K 9/00* (2006.01)
(Continued)

(52) U.S. Cl.
CPC .......... *G06T 5/005* (2013.01); *G06K 9/00228* (2013.01); *G06K 9/00248* (2013.01);
(Continued)

(58) Field of Classification Search
CPC .......... G06T 5/005; G06T 5/00; G06T 5/003; G06T 7/50; G06T 2207/20004;
(Continued)

(56) References Cited

U.S. PATENT DOCUMENTS 7,440,593 B1 10/2008 Steinberg
8,811,686 B2 8/2014 Brandt
(Continued)

FOREIGN PATENT DOCUMENTS

CN 103413270 A 11/2013
CN 103716547 A 4/2014
(Continued)

OTHER PUBLICATIONS

International Search Report in international appplication No. PCT/CN2018/111283, dated Dec. 29, 2018.
(Continued)

*Primary Examiner* — Minjung Kim (57) ABSTRACT

An image processing method and device, an electronic device and a computer-readable storage medium are provided. The method includes that: face recognition is performed on an image to be processed; responsive to detecting that the image to be processed includes a portrait, a shooting distance of the portrait is acquired; responsive to determining that the shooting distance meets a preset distance condition, a parameter relationship matched with the met distance condition is acquired; a beauty parameter corresponding to the shooting distance is selected according to the parameter relationship; and beauty processing is performed on the portrait according to the beauty parameter.

18 Claims, 5 Drawing Sheets

(51) Int. Cl.
*G06T 7/50* (2017.01)
*H04N 5/232* (2006.01)

(52) U.S. Cl.
CPC ..... *G06K 9/00268* (2013.01); *G06K 9/00281* (2013.01); *G06T 5/00* (2013.01); *G06T 5/003* (2013.01); *G06T 7/50* (2017.01); *H04N 5/23219* (2013.01); *H04N 5/23229* (2013.01); *G06T 2207/20004* (2013.01); *G06T 2207/30201* (2013.01)

(58) Field of Classification Search
CPC . G06T 2207/30201; G06T 2207/10024; G06T 2207/10021; G06T 5/007; G06T 5/001; G06T 3/0012; H04N 5/23229; H04N 5/23219; G06K 9/00268; G06K 9/00248; G06K 9/00281; G06K 9/00228
See application file for complete search history.

(56) References Cited

U.S. PATENT DOCUMENTS

| | | | |
|---|---|---|---|
| 9,824,263 | B2 | 11/2017 | Guo et al. |
| 2004/0085324 | A1 | 5/2004 | Yao |
| 2004/0170337 | A1 | 9/2004 | Simon |
| 2006/0153470 | A1 | 7/2006 | Simon |
| 2006/0228037 | A1 | 10/2006 | Simon |
| 2006/0228038 | A1 | 10/2006 | Simon |
| 2006/0228039 | A1 | 10/2006 | Simon |
| 2006/0228040 | A1 | 10/2006 | Simon |
| 2007/0070214 | A1 | 3/2007 | Nakamura |
| 2007/0122008 | A1 | 5/2007 | Perlin |
| 2007/0258656 | A1 | 11/2007 | Aarabi |
| 2007/0280662 | A1* | 12/2007 | Endo ............... G03B 13/34 396/67 |
| 2008/0013799 | A1 | 1/2008 | Steinberg |
| 2008/0013800 | A1* | 1/2008 | Steinberg ........ G06K 9/00228 382/118 |
| 2008/0020795 | A1* | 1/2008 | Kim ............... H04N 5/232 455/556.1 |
| 2010/0040262 | A1 | 2/2010 | Perlin |
| 2010/0220899 | A1 | 9/2010 | Steinberg |
| 2011/0091113 | A1 | 4/2011 | Ito |
| 2011/0164825 | A1 | 7/2011 | Perlin |
| 2011/0182592 | A1 | 7/2011 | Mizuno |
| 2011/0267646 | A1 | 11/2011 | Shinohara |
| 2012/0007939 | A1 | 1/2012 | Michrowski |
| 2012/0007940 | A1 | 1/2012 | Michrowski |
| 2012/0007942 | A1 | 1/2012 | Michrowski |
| 2012/0075504 | A1 | 3/2012 | Steinberg |
| 2012/0155709 | A1 | 6/2012 | Steinberg |
| 2012/0200732 | A1 | 8/2012 | Takeuchi |
| 2012/0320239 | A1 | 12/2012 | Uehara |
| 2013/0094757 | A1 | 4/2013 | Perlin et al. |
| 2013/0169821 | A1 | 7/2013 | Steinberg et al. |
| 2013/0194375 | A1 | 8/2013 | Michrowski et al. |
| 2013/0208994 | A1 | 8/2013 | Shirata |
| 2013/0314525 | A1 | 11/2013 | Steinberg et al. |
| 2013/0315488 | A1 | 11/2013 | Steinberg et al. |
| 2014/0036109 | A1 | 2/2014 | Steinberg et al. |
| 2014/0043499 | A1 | 2/2014 | Park et al. |
| 2014/0099026 | A1 | 4/2014 | Krishnaswamy |
| 2015/0049924 | A1 | 2/2015 | Tang et al. |
| 2015/0139534 | A1* | 5/2015 | Komatsu ............ G06T 7/62 382/154 |
| 2016/0055368 | A1 | 2/2016 | Cao et al. |
| 2016/0337599 | A1 | 11/2016 | Williams et al. |
| 2017/0054898 | A1 | 2/2017 | Sato |
| 2017/0249503 | A1 | 8/2017 | Guo et al. |
| 2018/0137610 | A1* | 5/2018 | Aflaki Beni ............ G06T 5/001 |

FOREIGN PATENT DOCUMENTS

| | | |
|---|---|---|
| CN | 104159032 A | 11/2014 |
| CN | 104503749 A | 4/2015 |
| CN | 104537612 A | 4/2015 |
| CN | 104580901 A | 4/2015 |
| CN | 104754221 A | 7/2015 |
| CN | 104902170 A | 9/2015 |
| CN | 104902177 A | 9/2015 |
| CN | 105096241 A | 11/2015 |
| CN | 105812652 A | 7/2016 |
| CN | 106331492 A | 1/2017 |
| CN | 106993137 A | 7/2017 |
| CN | 107124548 A | 9/2017 |
| CN | 107302662 A | 10/2017 |
| CN | 107302663 A | 10/2017 |
| CN | 107680128 A | 2/2018 |
| CN | 107798652 A | 3/2018 |
| JP | 2011175529 A | 9/2011 |
| WO | 2017177259 A1 | 10/2017 |

OTHER PUBLICATIONS

Written Opinion of the International Search Authority in international application No. PCT/CN2018/111283, dated Dec. 29, 2018.
European Search Report in European application No. 18202029.7, dated Feb. 20, 2019.
Lingyu Liang et al:"Facial Skin Beautification Using Adaptive Region-Aware Masks", IEEE Transactions on Cybernetics, vo 1. 44, No. 12, Dec. 1, 2014 (Dec. 1, 2014), pp. 2600-2612, XP055558761, Piscataway, NJ, USA ISSN: 2168-2267, DOI:10.1109/TCYB.2014. 2311033* abstract  figure 7  figure 2*.
International Search Report in international application No. PCT/CN2018/111458, dated Jan. 23, 2019.
Written Opinion of the International Search Authority in international application No. PCT/CN2018/111458, dated Jan. 23, 2019.
Supplementary European Search Report in European application No. 18202025.5, dated Mar. 1, 2019.
First Office Action of the Chinese application No. 201711045673.9, dated Jul. 15, 2019.
Second Office Action of the Chinese application No. 201711045673. 9, dated Oct. 28, 2019.
Notice of Allowance of the Chinese application No. 201711045673. 9, dated Feb. 12, 2020.
First Office Action of the European application No. 18202029.7, dated May 18, 2020.
Final Office Action of the U.S. Appl. No. 16/135,464, dated May 13, 2020.

* cited by examiner

Image A        Image B        Image C

IMAGE PROCESSING METHOD AND DEVICE, ELECTRONIC DEVICE AND COMPUTER-READABLE STORAGE MEDIUM

CROSS-REFERENCE TO RELATED APPLICATION

The present application claims priority to Chinese Patent Application 201711045673.9, filed on Oct. 31, 2017, the contents of which are hereby incorporated by reference in its entirety.

TECHNICAL FIELD

The disclosure relates to the field of image processing, and particularly to an image processing method and device, an electronic device and a computer-readable storage medium.

BACKGROUND

After an electronic device acquires a portrait through a camera and the like, beauty processing may be performed on the acquired portrait through a beauty technology. Beauty processing may include whitening, filtering, eye widening, face-lift, slimming and the like. During a conventional beauty processing, fixed beauty parameters are preset, and each acquired portrait is processed through the fixed beauty parameters in a unified manner.

SUMMARY

Embodiments of the disclosure provide an image processing method and device, an electronic device and a computer-readable storage medium, which may adaptively select a beauty parameter according to a shooting distance to improve a beauty effect and achieve a better visual display effect on an image.

According to a first aspect, the embodiments of the disclosure provide an image processing method. The image processing method may include the following operations. Face recognition is performed on an image to be processed. Responsive to detecting that the image to be processed includes a portrait, a shooting distance of the portrait is acquired. Responsive to determining that the shooting distance meets a preset distance condition, a parameter relationship matched with the met distance condition is acquired. A beauty parameter corresponding to the shooting distance is selected according to the parameter relationship and beauty processing is performed on the portrait according to the beauty parameter.

According to a second aspect, the embodiments of the disclosure provide an electronic device. The electronic device may include a memory and a processor. The memory stores a computer program that, when executed by the processor, causes the processor to implement the method described in the first aspect.

According to a third aspect, the embodiments of the disclosure provide a non-transitory computer-readable storage medium is provided, on which a computer program may be stored. The computer program may be executed by a processor to implement the method described in the first aspect.

BRIEF DESCRIPTION OF DRAWINGS

FIG. 9($a$) is a schematic diagram of a parameter relationship between beauty parameters and shooting distances when the shooting distance is smaller than a first distance threshold according to an embodiment of the disclosure.

FIG. 9($b$) is a schematic diagram of a parameter relationship between beauty parameters and shooting distances when the shooting distance is larger than a second distance threshold according to an embodiment of the disclosure.

DETAILED DESCRIPTION

In order to make the purposes, technical solutions and advantages of the disclosure clearer, the disclosure will be further described below in combination with the drawings and the embodiments in detail. It should be understood that the specific embodiments described herein are only adopted to explain the disclosure and not intended to limit the disclosure.

It can be understood that terms "first", "second" and the like used in the disclosure may be adopted to describe various components and not intended to limit these components. These terms are only adopted to distinguish a first component from another component. For example, without departing from the scope of the disclosure, a first client may be called a second client, and similarly, the second client may be called the first client. Both of the first client and the second client are clients but not the same client.

According to the image processing method and device, the electronic device and the computer-readable storage medium provided by the embodiments of the disclosure, responsive to detecting that the image to be processed includes the portrait, the shooting distance of the portrait is acquired, when the shooting parameter meets the preset distance condition, the parameter relationship matched with the met distance condition is acquired, the beauty parameter corresponding to the shooting distance is selected according to the parameter relationship, and beauty processing is performed on the portrait according to the beauty parameter. Therefore, the beauty parameter may be adaptively selected according to the shooting distance, such that a beauty effect may be improved and a better visual display effect on the image may be achieved.

Figure 1:
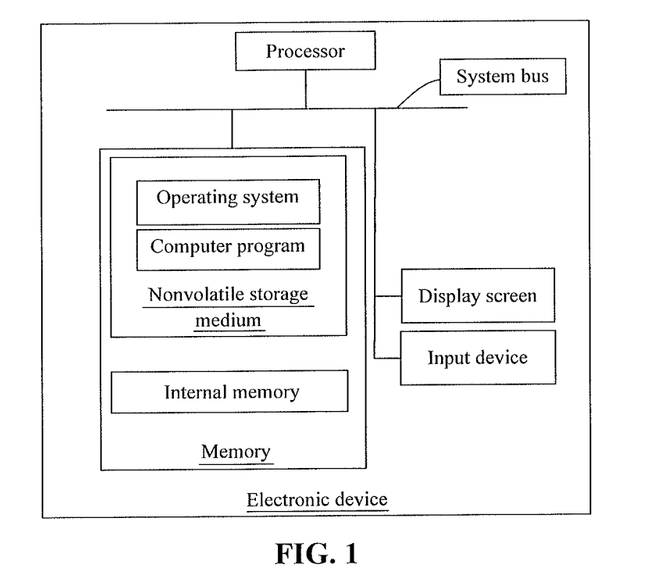
FIG. 1 is a block diagram of an electronic device according to an embodiment of the disclosure.

FIG. 1 is a block diagram of an electronic device according to an embodiment of the disclosure. As illustrated in FIG. 1, the electronic device includes a processor, a memory, a display screen and an input device, all of which are connected through a system bus. In the example, the memory may include a nonvolatile storage medium and a processor. The nonvolatile storage medium of the electronic device may store an operating system and a computer program, and the computer program may be executed by the processor to implement an image processing method provided by the embodiments of the disclosure. The processor may be configured to provide a calculation and control capability to support running of the whole electronic device. An internal memory of the electronic device may provide an environment for running of the computer program in the nonvolatile storage medium. The display screen of the electronic device may be a liquid crystal display screen, an electronic ink display screen or the like. The input device may be a touch layer covering the display screen, may also be a button, trackball or touchpad arranged on a housing of the electronic device, and may further be an external keyboard, touchpad, mouse or the like. The electronic device may be a terminal, such as a mobile phone, a tablet computer, a personal digital assistant, wearable equipment or the like. It can be understood by those skilled in the art that the structure illustrated in FIG. 1 is only a block diagram of a part of structure related to the solutions of the disclosure and not intended to limit the electronic device to which the solutions of the disclosure are applied. The electronic device may specifically include components more or less than those illustrated in the figure, or some components are combined or different component arrangements are adopted.

Figure 2:
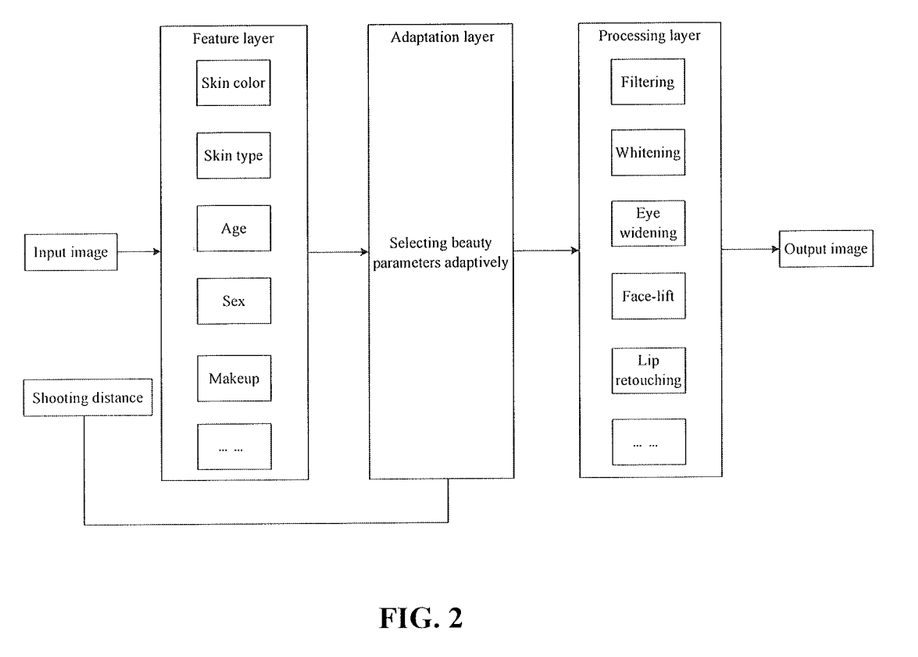
FIG. 2 is an architecture diagram of an image processing method according to an embodiment of the disclosure.

FIG. 2 is an architecture diagram of an image processing method according to an embodiment of the disclosure. As illustrated in FIG. 2, beauty processing involved in electronic device may include three layers of architectures, i.e., a feature layer, an adaptation layer and a processing layer. The feature layer may be configured to extract facial feature information of an input image, and the facial feature information may include, but not limited to, a skin color feature, a skin type feature, an age feature, a sex feature, a makeup feature and the like.

The adaptation layer may be configured to adaptively select a beauty parameter according to the extracted facial feature information, an acquired physical shooting parameter and the like. In the example, the physical shooting parameter may include, but not limited to, a shooting distance, ambient brightness, a color temperature, exposure and the like. In at least one embodiment, a parameter selection model may be pre-stored in the adaptation layer, and the facial feature information, the acquired physical shooting parameter and the like may be analyzed through the parameter selection model, so as to select the beauty parameter corresponding to the facial feature information and the physical shooting parameter. The parameter selection model may be constructed by deep machine learning. The beauty parameter selected by the adaptation layer may include, but not limited to, a whitening parameter, a filtering parameter, an eye widening parameter, a face-lift parameter and the like.

The processing layer may be configured to call a corresponding beauty component according to the beauty parameter selected by the adaptation layer to perform beauty processing on the input image. Beauty components may include, but not limited to, a filtering component, a whitening component, an eye widening component, a face-lift component, a lip retouching component and the like. Different beauty components may perform corresponding processing according to beauty parameters. For example, the filtering component may perform filtering processing on the input image according to the filtering parameter, and the whitening component may perform whitening processing on the input image according to the whitening parameter. Beauty components may be mutually independent. In an embodiment, the processing layer may acquire a flag bit corresponding to each beauty component. In the example, the beauty component of which the flag bit is a first flag bit may be required to perform beauty processing on the input image, the beauty component of which the flag bit is a second flag bit may not perform beauty processing on the input image, and the first flag bit and the second flag bit may be set according to a requirement. For example, the first flag bit is 1 and the second flag bit is 0, which will not be limited herein. When a beauty component is required to perform beauty processing on the input image, the beauty component may acquire the beauty parameter of the corresponding type and perform beauty processing on the input image according to the beauty parameter. After performing beauty processing on the input image according to the beauty parameter selected by the adaptation layer, the processing layer may output the processed image and display the processed image on a display screen.

Figure 3:
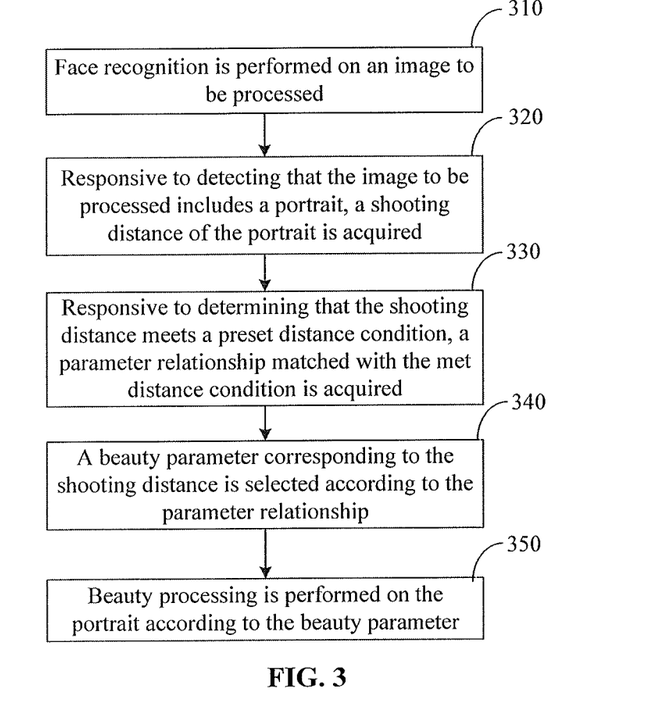
FIG. 3 is a flowchart of an image processing method according to an embodiment of the disclosure.

As illustrated in FIG. 3, an image processing method is provided in an embodiment of the disclosure. The image processing method includes the following operations at blocks 310 to 350.

At block 310, face recognition is performed on an image to be processed.

An electronic device may acquire the image to be processed. The image to be processed may be a preview image that may be previewed on a display screen, wherein the preview image may be acquired by the electronic device through an imaging device such as a camera. The image to be processed may also be an image which has been generated and stored. The electronic device may perform face recognition on the image to be processed to determine whether the image to be processed include a portrait. The electronic device may extract an image feature of the image to be processed and analyze the image feature through a preset face recognition model to determine whether the image to be processed includes a face. When determining that the image to be processed includes a face, the electronic device may determine that the image to be processed includes the portrait. The image feature may include a shape feature, a spatial feature, an edge feature and the like. In the example, the shape feature refers to a shape of a part of the image to be processed, the spatial feature refers to a spatial position or relative direction relationship between multiple regions divided in the image processed, and the edge feature refers to a boundary pixel and the like between two regions in the image to be processed.

In an embodiment, the face recognition model may be a decision-making model constructed in advance through machine learning. When the face recognition model is constructed, a large number of sample images may be acquired, and the sample images include facial images and no-portrait images. The sample images may be marked according to the determination regarding whether each sample image includes a face. The marked sample images are taken as input of the face recognition model, and training is performed through machine learning to obtain the face recognition model.

At block 320, responsive to detecting that the image to be processed includes a portrait, a shooting distance of the portrait is acquired.

When the electronic device detects that the image to be processed includes the portrait, the shooting distance of the portrait included in the image to be processed may be acquired. The shooting distance may refer to a distance between the portrait and an imaging plane of the camera when the image to be processed is acquired, and the shooting distance may also be a distance between the portrait and the electronic device when the image to be processed is acquired.

In an embodiment, the image to be processed may be a preview image which is acquired by the electronic device through the camera, and the preview image may be displayed on the display screen. When the image is acquired, the electronic device may acquire the shooting distance of the portrait in real time through a distance sensor. In at least one embodiment, the distance sensor may externally emit light and may measure time that the light is reflected by the portrait and then determine the shooting distance of the portrait according to the time. The electronic device may also adopt another manner to acquire the shooting distance of the portrait in the image to be processed, which will be not limited herein.

At block 330, responsive to determining that the shooting distance meets a preset distance condition, a parameter relationship matched with the met distance condition is acquired.

The electronic device may determine whether the shooting distance of the portrait in the image to be processed meets the preset distance condition. The distance condition refers to a distance range in which the acquired image may blur. The distance condition may be preset according to a requirement. There may be one or more distance conditions, and each distance condition may correspond to a specific distance range. The electronic device may compare the shooting distance of the portrait in the image to be processed with the distance range corresponding to each distance condition, and determine whether the shooting distance of the portrait falls within the distance range. When determining that the shooting distance of the portrait is within the distance range, the electronic device may determine that the corresponding distance condition is met. For example, two distance conditions, i.e., smaller than 30 centimeters and larger than 60 centimeters, may be preset. When the shooting distance of the portrait in the image to be processed is 20 centimeters, the distance condition of smaller than 30 centimeters is met.

In an embodiment, when the electronic device turns on the camera to acquire the image, multiple frames of images in a present scenario may be acquired at first, and a shooting distance of each shot object in the acquired multiple frames of images may be acquired. Then, sharpness of each shot object in the acquired multiple frames of images may be detected, and the distance condition is determined according to the sharpness. The electronic device may acquire the shot object of which the sharpness is lower than a preset value in the present scenario and determine the distance condition according to the shooting distance of the shot object. For example, when an shot object acquired by the electronic device in the present scenario has sharpness lower than the preset value and the shooting distance of the shot object is 25 centimeters, the electronic device may directly determine the distance condition to be smaller than 25 centimeters. The electronic device may also set a floating value according to the sharpness of the shot object and then determine the distance condition according to the floating value and the shooting distance of the shot object. If the sharpness is lower, the floating value may be larger. If the sharpness is higher and more approximate to the preset value, the floating value may be smaller. For example, when an shot object acquired by the electronic device in the present scenario has sharpness lower than the preset value and the shooting distance of the shot object is 25 centimeters, the electronic device may set the floating value to be 5 centimeters according to the sharpness of the shot object and determine the distance condition to be smaller than 30 centimeters and the like.

Different distance conditions may be matched with different parameter relationships, and the parameter relationship may be configured to describe a corresponding relationship between the distance conditions and the beauty parameters. When the shooting distance meets the preset distance condition, the beauty parameter may change along with a change in the shooting distance of the portrait, and changing process of the beauty parameter may be consistent with the parameter relationship matched with the met distance condition. When the shooting distance of the portrait in the image to be processed meets the preset distance condition, the electronic device may acquire the parameter relationship matched with the met distance condition and select the beauty parameter corresponding to the shooting distance according to the matched parameter relationship.

At block 340, a beauty parameter corresponding to the shooting distance is selected according to the parameter relationship.

The electronic device may select the beauty parameter corresponding to the shooting distance of the portrait according to the parameter relationship matched with the met distance condition. In the example, the beauty parameter may include, but not limited to, a whitening parameter, a filtering parameter, an eye widening parameter, a face-lift parameter and the like. In an embodiment, in different distance conditions, the shooting distance of the portrait may influence the beauty parameters of different types, and the beauty parameter influenced by the shooting distance may change along with the change in the shooting distance. For example, two distance conditions, i.e., smaller than 30 centimeters and larger than 60 centimeters, may be preset. The distance condition of smaller than 30 centimeters may influence the whitening parameter, the filtering parameter and the eye widening parameter, while the distance condition of larger than 60 centimeters may influence the whitening parameter and the filtering parameter. However, there are no limits made herein.

In the preset distance condition, the beauty parameters of different types may form different parameter relationships with the shooting distance. When the shooting distance of the portrait meets the preset distance condition, the electronic device may acquire beauty parameter types corresponding to the met distance condition at first, then acquire parameter relationships matched with the beauty parameter types and select the beauty parameter of the corresponding type according to each acquired parameter relationship. For example, the shooting distance of the portrait in the image to be processed meets the distance condition of smaller than 30 centimeters, the shooting distance may influence the whitening parameter, the filtering parameter and the eye widening parameter under this distance condition. Therefore, the electronic device may acquire the parameter relationships with the whitening parameter, the filtering parameter and the eye widening parameter respectively and select beauty parameters corresponding to the shooting distance according to the acquired parameter relationships, respectively.

At block 350, beauty processing is performed on the portrait according to the beauty parameter.

The electronic device may perform beauty processing on the portrait in the image to be processed according to the selected beauty parameter. Beauty processing may include, but not limited to, whitening processing, filtering processing, eye widening processing and the like. In the example, whitening processing may refer to regulating a color value of each pixel in a skin region of the portrait according to the whitening parameter, and the color value may be a value of the pixel in a color space of Red, Green and Blue (RGB), Hue, Saturation and Value (HSV), Luma and Chroma (YUV) or the like, filtering processing may refer to selecting a target window and performing filtering processing on the skin region of the portrait according to the target window, and eye widening processing may refer to performing partial enlargement processing on an eye region of a face. However, there are no limits made herein.

In the embodiment, responsive to detecting that the image to be processed includes the portrait, the shooting distance of the portrait is acquired, when the shooting parameter meets the preset distance condition, the parameter relationship matched with the met distance condition is acquired. Then, the beauty parameter corresponding to the shooting distance is selected according to the parameter relationship, and beauty processing is performed on the portrait according to the beauty parameter. Therefore, the beauty parameter may be adaptively selected according to the shooting distance, so as to improve a beauty effect and achieve a better visual display effect on the image.

Figure 4:
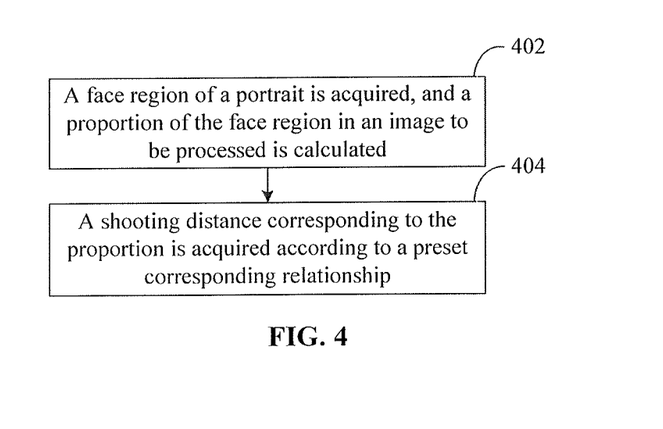
FIG. 4 is a flowchart of acquiring a shooting distance of a portrait according to an embodiment of the disclosure.

As illustrated in FIG. 4, in an embodiment, the operation that the shooting distance of the portrait is acquired includes the following actions at blocks 402 and 404.

At block 402, a face region of the portrait is acquired, and a proportion of the face region in the image to be processed is calculated.

The electronic device performs face recognition on the image to be processed, and may determine the face region responsive to detecting that the image to be processed includes the face. In at least one embodiment, the face region may be square or rectangular. The electronic device may calculate an area of the face region and calculate a portion of the area of the face region to an area of the image to be processed. The area of the face region may be divided by the area of the image to be processed to obtain the proportion.

At block 404, the shooting distance corresponding to the proportion is acquired according to a preset corresponding relationship.

Different proportions of the face region in the image to be processed may correspond to different shooting distances. The electronic device may acquire the shooting distance corresponding to the calculated proportion according to the preset corresponding relationship. In an embodiment, the preset corresponding relationship is illustrated in Table 1.

TABLE 1

| | Proportion | | | | | |
|---|---|---|---|---|---|---|
| | 90% | 80% | 60% | 50% | 20% | 15% |
| Shooting distance | 10 centimeters | 20 centimeters | 35 centimeters | 50 centimeters | 1 meter | 1.5 meter |

It can be understood that the corresponding relationship between the proportion of the area of the face region in the area of the image to be processed and the shooting distance is not limited to Table 1. There may be another corresponding relationship, which will be not limited herein.

Figure 5:
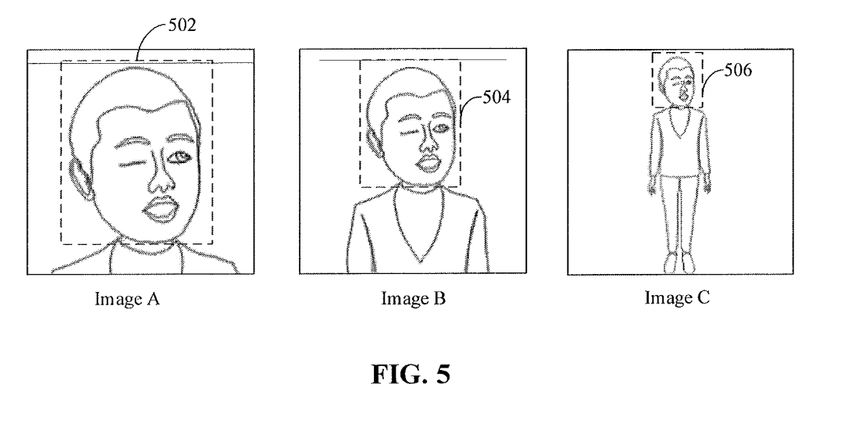
FIG. 5 is a schematic diagram of acquiring a shooting distance according to a proportion of a face region according to an embodiment of the disclosure.

FIG. 5 is a schematic diagram of acquiring a shooting distance based on a proportion of a face region according to an embodiment of the discourse. As illustrated in FIG. 5, an image A, an image B and an image C may be acquired through the operation that the electronic device shoots the same portrait through the camera at different shooting distances. The electronic device may acquire the image A, perform face recognition on the image A, determine a face region 502, calculate an area of the face region 502 and calculate a proportion of the area of the face region 502 in an area of the image A. In an embodiment, the proportion of the area of the face region 502 in the image A to the area of the image A is 80%, it may be acquired that the corresponding shooting distance is 20 centimeters. The electronic device may acquire the image B, perform face recognition on the image B, determine a face region 504, calculate an area of the face region 504 and calculate a proportion of the area of the face region 504 in an area of the image B. In an embodiment, the proportion of the area of the face region 504 in the image B to the area of the image B is 40%, it may be acquired that the corresponding shooting distance is 70 centimeters. The electronic device may acquire the image C, perform face recognition on the image C, determine a face region 506, calculate an area of the face region 506 and calculate a proportion of the area of the face region 506 in an area of the image C. In an embodiment, the proportion of the area of the face region 506 in the image C to the area of the image C is 15%, it may be acquired that the corresponding shooting distance is 1.5 meters.

In an embodiment, after calculating the proportion of the face region in the image to be processed, the electronic device may acquire focal length information of the camera for acquiring the image to be processed, acquire the corresponding relationship matched with the focal length information and then acquire the shooting distance corresponding to the proportion according to the matched corresponding relationship. A focal length is a measurement manner for measuring concentration or divergence of light in an optical system and refers to a distance from an optical center of a lens to a focal point where the light is concentrated during incidence of parallel light. Different focal length information of the camera represents different shooting viewing angle ranges. For different focal length information, there may be different corresponding relationships between the proportion of the area of the face region to the area of the image to be processed and the shooting distance. For the same proportion of the face region in the image to be processed, when the focal length is larger, the corresponding shooting distance is longer. For example, the proportion of the face region in the image to be processed is 80%. If the focal length information of the camera is 16 millimeters, the corresponding shooting distance may be 20 centimeters. If the focal length information of the camera is 24 millimeters, the corresponding shooting distance may be 45 centimeters.

In the embodiment, the shooting distance of the portrait may be acquired according to the proportion of the face region in the image to be processed, so that the shooting distance may be accurately acquired to facilitate subsequent adaptive selection of the beauty parameter according to the shooting distance. Therefore, the beauty effect may be improved, and the better visual display effect on the image may be achieved.

Figure 6:
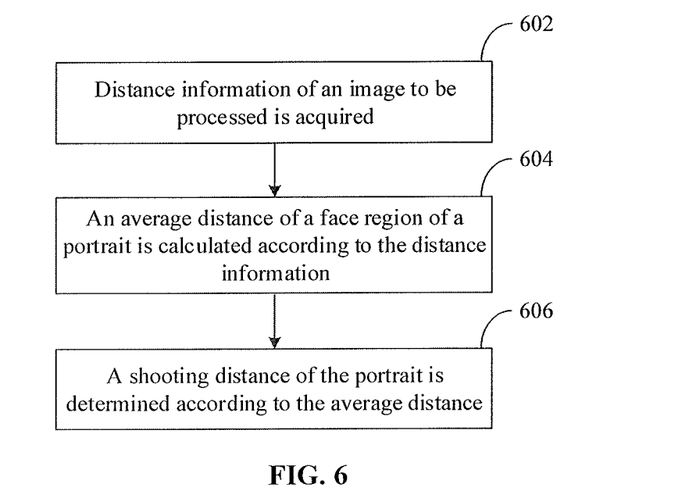
FIG. 6 is a flowchart of acquiring a shooting distance of a portrait according to another embodiment of the disclosure.

As illustrated in FIG. 6, in an embodiment, the operation that the shooting distance of the portrait is acquired includes the following actions at blocks 602 to 606.

At block 602, distance information of the image to be processed is acquired.

The electronic device may acquire distance information of each pixel in the image to be processed. In the embodiment, the distance information may indicate a distance between each object in the image to be processed and the electronic device. In an embodiment, two cameras, including a first camera and a second camera, may be arranged on a back surface of the electronic device. The first camera and the second camera may be arranged on the same horizontal line to form a horizontal left-right arrangement, and may also be arranged on the same vertical line to form a vertical top-bottom arrangement. In the embodiment, the first camera and the second camera may be cameras with different resolutions. The first camera may be a camera with a relatively high resolution and mainly configured for imaging, and the second camera may be an assistant camera with a relatively low resolution and configured to acquire the distance information of the acquired image.

Furthermore, the electronic device may acquire a first image of a scenario through the first camera, simultaneously acquire a second image of the same scenario through the second camera, correct and calibrate the first image and the second image. Then, the electronic device may synthesize the corrected and calibrated first image and second image to obtain the image to be processed. The electronic device may generate a parallax image according to the corrected and calibrated first image and second image and then generate a distance map of the image to be processed. The distance map may include the distance information of each pixel in the image to be processed. In the distance map, regions with approximate distance information may be filled with the same color, and color changes may reflect changes in distance. In an embodiment, the electronic device may calculate a correction parameter according to a distance between optical centers of the first camera and the second camera, a height difference of the optical centers on the horizontal line, a lens height difference of the two cameras and the like, correct and calibrate the first image and the second image according to the correction parameter.

Figure 7:
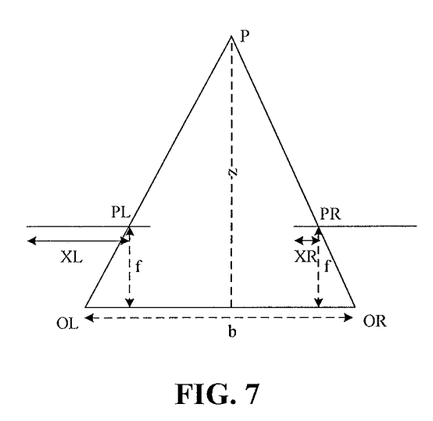
FIG. 7 is a schematic diagram of calculating distance information according to an embodiment of the disclosure.

The electronic device calculates a parallax of the same shot object in the first image and the second image and obtains distance information of the shot object in the image to be processed according to the parallax. In the example, the parallax refers to a direction difference formed when the same target is observed at two points. FIG. 7 is a schematic diagram of calculating distance information according to an embodiment. As illustrated in FIG. 7, the first camera and the second camera are arranged in left-right manner on the same horizontal line, primary optical axes of the two cameras are parallel, the optical centers of the first camera and the second camera are OL and OR respectively, and shortest distances between the optical centers and corresponding image surfaces are focal lengths f. If P is a point in a world coordinate system, its imaging points on the left phase surface and the right phase surface are PL and PR, and distances from the PL and the PR to left edges of the respective image surfaces are XL and XR respectively. Therefore, a parallax of P is XL−XR or XR−XL. The distance between the optical center OL of the first camera and the optical center OR of the second camera is b, distance Z of the point P may be calculated according to the distance b between the OL and the OR, the focal length f and the parallax XL−XR or XR−XL, and its calculation method is expressed by the following formula (1):

$$Z = \frac{f*b}{XL-XR} \text{ or } Z = \frac{f*b}{XR-XL}. \quad (1)$$

The electronic device may perform feature point matching on the first image and the second image, extract a feature point of the first image and find an optimal matched point from a corresponding row of the second image. It may be considered that the feature point of the first image and the corresponding optimal matched point of the second image are imaging points of the same point in the first image and the second image respectively. Then, a parallax between the feature point of the first image and the corresponding optimal matched point of the second image may be calculated to generate a parallax image, and the distance information of each pixel in the image to be processed may be calculated according to formula (1).

In another embodiment, the distance information of the image to be processed may also be acquired in another manner. For example, the distance information of the image to be processed may be calculated in, but not limited to, a manner of structured light, Time of Flight (TOF) or the like.

At block 604, an average distance of the face region of the portrait is calculated according to the distance information.

After determining the face region of the image to be processed, the electronic device may acquire the distance information (i.e., the distance value z) of each pixel in the face region and calculate the average distance of the face region. In an example, distance values of all pixels in the face region are averaged, and the averaged value may be determined as the average distance of the face region.

At block 606, the shooting distance of the portrait is determined according to the average distance.

The electronic device may directly take the average distance of the face region as the shooting distance of the portrait. The electronic device may also establish a corresponding relationship between an average distance of a face region and a shooting distance of a portrait, and acquire the shooting distance corresponding to the average distance of the face region according to the corresponding relationship. For example, the average distance of the face region in the image to be processed is 50 centimeters, and it may directly be determined that the shooting distance of the portrait is 50 centimeters. In an alternative example, the corresponding relationship between the average distance of the face region and the shooting distance of the portrait is pre-established, and the shooting distance corresponding to the average distance of the face region of 50 centimeters may be 60 centimeters according to the corresponding relationship. However, there are no limits made herein.

In the embodiment, the shooting distance of the portrait may be determined according to the distance information of the image to be processed, so as to facilitate subsequent adaptive selection of the beauty parameter according to the shooting distance. Therefore, the beauty effect may be improved, and the better visual display effect on the image may be achieved.

Figure 8:
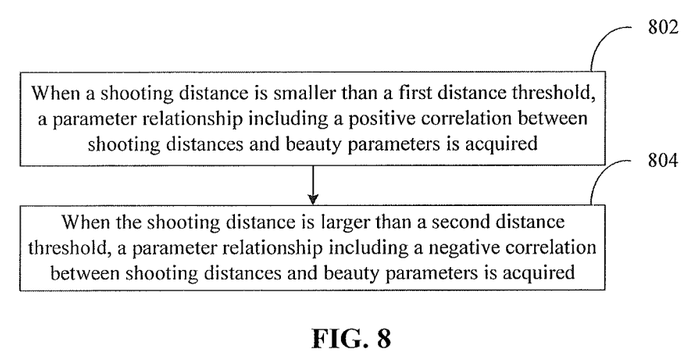
FIG. 8 is a flowchart of acquiring a parameter relationship according to an embodiment of the disclosure.

As illustrated in FIG. 8, in an embodiment, the operation at block 330 that the parameter relationship matched with the met distance condition is acquired responsive to determining that the shooting distance meets the preset distance condition further includes the following actions at blocks 802 and 804.

At block 802, when the shooting distance is smaller than a first distance threshold, a parameter relationship including a positive correlation between shooting distances and beauty parameters is acquired.

The electronic device may preset distance conditions, and each distance condition may correspond to a specific distance range. The distance range may include a distance threshold, and the distance threshold may be configured to determine whether the shooting distance of the portrait in the image to be processed meets the distance condition. In an embodiment, the electronic device may set two distance conditions, wherein the first distance condition may be smaller than the first distance threshold, and the second distance condition may be larger than a second distance threshold.

When the shooting distance of the portrait in the image to be processed is smaller than the first distance threshold, the shooting distance meets the first distance condition, and a parameter relationship of the first distance condition may be acquired, wherein the parameter relationship may be the positive correlation between the shooting distances and the beauty parameters. When the shooting distance of the portrait in the image to be processed is smaller than the first distance threshold, a shorter shooting distance may make the acquired image to be processed to be more blurred, and the beauty parameter may be reduced as the shooting distance decreases.

At block 804, when the shooting distance is larger than a second distance threshold, a parameter relationship including a negative correlation between shooting distances and beauty parameters is acquired.

When the shooting distance of the portrait in the image to be processed is larger than the second distance threshold, the shooting distance meets the second distance condition, and a parameter relationship of the second distance condition may be acquired, wherein the parameter relationship may be the negative correlation between the shooting distances and the beauty parameters. When the shooting distance of the portrait in the image to be processed is larger than the second distance threshold, a longer shooting distance may make the acquired image to be processed to be more blurred, and the beauty parameter may be reduced as the shooting distance increases. Furthermore, the parameter relationships corresponding to the first distance threshold and the second distance threshold may be linear relationships.

Figure 9A:
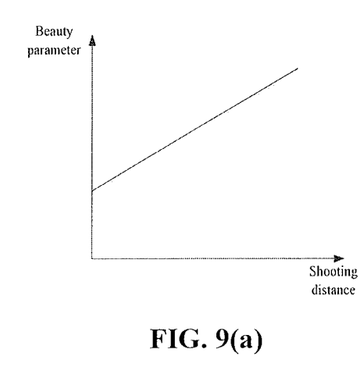

FIG. 9(a) is a schematic diagram of a parameter relationship between beauty parameters and shooting distances when the shooting distance is smaller than a first distance threshold according to an embodiment of the disclosure. As illustrated in FIG. 9(a), when the shooting distance is smaller than the first distance threshold, the shooting distance meets the first distance condition, the shooting distance may form the positive correlation with the beauty parameter, and the beauty parameter may be reduced as the shooting distance decreases. Furthermore, the positive correlation may be a linear relationship.

Figure 9B:
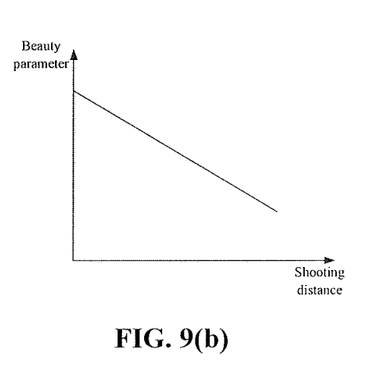

FIG. 9(b) is a schematic diagram of a parameter relationship between beauty parameters and shooting distances when the shooting distance is greater than a second distance threshold according to an embodiment of the disclosure. As illustrated in FIG. 9(b), when the shooting distance is larger than the second distance threshold, the shooting distance meets the second distance condition, the shooting distance may form the negative correlation with the beauty parameter, and the beauty parameter may be reduced as the shooting distance increases. Furthermore, the negative correlation may be a linear relationship. It can be understood that the parameter relationship between the beauty parameters and the shooting distances is not limited to the relationships illustrated in FIG. 9(a) and FIG. 9(b) and may also be another relationship.

In an embodiment, the electronic device may acquire the focal length information of the camera for acquiring the image to be processed and determine the first distance threshold and the second distance threshold according to the focal length information. For cameras with different focal lengths, shooting distances may be different, and distance ranges capable of ensuring shooting sharpness are also different. When the focal length is relatively large, a relatively close object is likely to blur when being acquired, and the corresponding first distance threshold and second distance threshold may be relatively larger. When the focal length is relatively small, a relatively far object is likely to blur when being acquired, and the corresponding first distance threshold and second distance threshold may be relatively small. The first distance threshold and the second distance threshold are determined according to the focal length information of the camera for acquiring the image, so that the selected beauty parameter may be more accurate, and the beauty effect may be improved.

In an embodiment, the shooting distance belongs to a sharp imaging range of the camera when not meeting the preset distance condition, the sharpness of the portrait in the acquired image to be processed is relatively high, and the shooting distance may have no influence on the beauty parameter. When the shooting distance is larger than or equal to the first distance threshold and smaller than or equal to the second distance threshold, the electronic device, after acquiring the face region of the image to be processed, may extract the facial feature information of the face region. Then, the electronic device may select the beauty parameter according to the facial feature information and perform beauty processing on the face region of the image to be processed according to the beauty parameter. The facial feature information may include, but not limited to, a skin color feature, a skin type feature, a facial form feature, features of the five sense organs and the like. In the example, the skin color feature may include information of the color value, brightness value and the like of each pixel in the skin region of the face. The skin type feature may include texture information, edge information, edge intensity and the like of the skin region of the face. The facial form feature may include information of feature points for forming a facial contour and the like. The features of the five sense organs may include information of feature points for representing shapes and positions of the five sense organs and the like.

In an embodiment, when the shooting distance is larger than or equal to the first distance threshold and smaller than or equal to the second distance threshold, the electronic device may acquires the face region of the image to be processed and determine the skin region of the face region. Then, the electronic device may extract the skin type feature of the skin region and analyze the skin type feature through a preset classification model to obtain a skin type level. The electronic device may acquire the filtering parameter corresponding to the skin type level and perform filtering processing on the skin region according to the filtering parameter. The classification model may be constructed in advance by machine learning. In an embodiment, the electronic device may construct the classification model in advance and may acquire a large number of sample images, wherein a skin type level is marked in each sample image. In at least one embodiment, the skin type levels may be divided according to a requirement. Facial skin in the sample images may correspond to a relatively low skin type level if the facial skin is relatively smooth and clean. Facial skin in the sample images may correspond to a relatively high skin type level if the facial skin includes more freckles, acnes or wrinkles and has more blemishes. The electronic device may take the sample images as input of the classification model and perform train in a manner of machine learning and the like to construct the classification model.

The electronic device may acquire the filtering parameter corresponding to the skin type level. Different skin type levels may correspond to different filtering parameters, and the filtering parameter may include a parameter such as a window radius. The electronic device may acquire the window radius corresponding to the skin type level, select a target window corresponding to the window radius and perform filtering processing on the skin region according to the target window. Filtering processing may be edge-preserving smooth filtering, bilateral filtering, Gaussian filtering and the like. When the filtering parameter is relatively large, a corresponding filtering degree is relatively high, and the electronic device may select a target window with a relatively large window radius for filtering processing. In this case, it may achieve a relatively good smoothing effect but bring relatively high information loss. When the filtering parameter is relatively small, the corresponding filtering degree is relatively low, and the electronic device may select a target window with a relatively small window radius for filtering processing. In this case, it may reserve more information but achieve a relatively poor smoothing effect. The filtering parameter is adaptively selected according to the skin type level of the skin region, and the corresponding filtering degree may be selected according to an actual condition of the skin region, thereby reducing the condition of poor smoothing effect caused by an excessively low filtering degree, loss of skin details caused by an excessively high filtering degree or the like.

In the embodiment, the beauty parameter corresponding to the shooting distance may be selected according to the parameter relationship matched with the met distance condition, so that the beauty parameter may be adaptively selected according to the shooting distance. Therefore, the beauty effect may be improved and the better visual display effect on the image may be achieved.

In an embodiment, the image processing method further includes the following operation. When the shooting distance meets the preset distance condition, an enhancement coefficient corresponding to the shooting distance is acquired, and sharpening processing is performed on the portrait according to the enhancement coefficient.

When the shooting distance of the portrait in the image to be processed meets the preset distance condition, the electronic device may acquire the enhancement coefficient corresponding to the shooting distance and sharpen the portrait according to the enhancement coefficient, so as to enhance edge details of the portrait and make the portrait sharper. Furthermore, the electronic device may sharpen the face region of the portrait according to the enhancement coefficient. When the shooting distance is smaller than the first distance threshold, the enhancement coefficient may form a negative correlation with the shooting distance. When the shooting distance is shorter, the corresponding enhancement coefficient may be higher. When the shooting distance is larger than the second distance threshold, the enhancement coefficient may form a positive correlation with the shooting distance. When the shooting distance is longer, the corresponding enhancement coefficient may be higher.

In an embodiment, when the shooting distance meets the preset distance condition, the electronic device may acquire the sharpness of the portrait. Then, the electronic device may select the enhancement coefficient according to the sharpness and perform sharpening processing on the portrait according to the enhancement coefficient.

In the embodiment, when the shooting distance of the portrait in the image to be processed meets the preset distance condition, sharpening processing may be performed on the portrait to make the portrait in the image sharper, so that the visual display effect of the image may be improved.

In an embodiment, an image processing method is provided. The method may include the following operations.

In operation (1), face recognition is performed on an image to be processed.

In operation (2), responsive to detecting that the image to be processed includes a portrait, a shooting distance of the portrait is acquired.

In at least one embodiment, the operation that the shooting distance of the portrait is acquired includes that: a face region of the portrait is acquired, and a proportion of the face region in the image to be processed is calculated; and the shooting distance corresponding to the proportion is acquired according to a preset corresponding relationship.

In at least one embodiment, the operation that the shooting distance of the portrait is acquired includes that: the shooting distance of the portrait is acquired through a distance sensor.

In at least one embodiment, the operation that the shooting distance of the portrait is acquired includes that: distance information of the image to be processed is acquired; an average distance of the face region of the portrait is calculated according to the distance information; and the shooting distance of the portrait is determined according to the average distance.

In operation (3), responsive to determining that the shooting distance meets a preset distance condition, a parameter relationship matched with the met distance condition is acquired.

In at least one embodiment, responsive to determining that the shooting distance is smaller than a first distance threshold, a parameter relationship including a positive correlation between shooting distances and beauty parameters is acquired; and responsive to determining that the shooting distance is larger than a second distance threshold, a parameter relationship including a negative correlation between shooting distances and beauty parameters is acquired.

In at least one embodiment, before operation (3), the method may include that: focal length information of a camera for acquiring the image to be processed is acquired, and the first distance threshold and the second distance threshold are determined according to the focal length information.

In operation (4), a beauty parameter corresponding to the shooting distance is selected according to the parameter relationship.

In operation (5), beauty processing is performed on the portrait according to the beauty parameter.

In operation (6), when the shooting distance meets the preset distance condition, an enhancement coefficient corresponding to the shooting distance is acquired, and sharpening processing is performed on the portrait according to the enhancement coefficient.

In the embodiment, responsive to detecting that the image to be processed includes the portrait, the shooting distance of the portrait is acquired. When the shooting parameter meets the preset distance condition, the parameter relationship matched with the met distance condition is acquired, the beauty parameter corresponding to the shooting distance is selected according to the parameter relationship, and beauty processing is performed on the portrait according to the beauty parameter. Therefore, the beauty parameter may be adaptively selected according to the shooting distance, such that a beauty effect may be improved and a better visual display effect on the image may be achieved.

Figure 10:
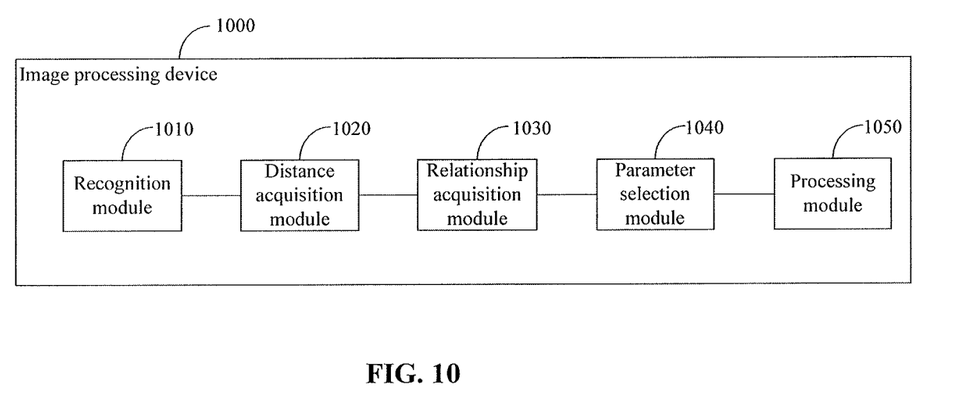
FIG. 10 is a block diagram of an image processing device according to an embodiment of the disclosure.

As illustrated in FIG. 10, an embodiment of the disclosure provides an image processing device 1000. The image processing device 1000 includes a recognition module 1010, a distance acquisition module 1020, a relationship acquisition module 1030, a parameter selection module 1040 and a processing module 1050.

The recognition module 1010 may be configured to perform face recognition on an image to be processed.

The distance acquisition module 1020 may be configured to, responsive to detecting that the image to be processed includes a portrait, acquire a shooting distance of the portrait.

In at least one embodiment, the distance acquisition module 1020 may further be configured to acquire the shooting distance of the portrait through a distance sensor.

The relationship acquisition module 1030 may be configured to, responsive to determining that the shooting distance meets a preset distance condition, acquire a parameter relationship matched with the met distance condition.

The parameter selection module 1040 may be configured to select a beauty parameter corresponding to the shooting distance according to the parameter relationship.

The processing module 1050 may be configured to perform beauty processing on the portrait according to the beauty parameter.

In the embodiment, responsive to detecting that the image to be processed includes the portrait, the shooting distance of the portrait is acquired. When the shooting parameter meets the preset distance condition, the parameter relationship matched with the met distance condition is acquired, the beauty parameter corresponding to the shooting distance is selected according to the parameter relationship, and beauty processing is performed on the portrait according to the beauty parameter. Therefore, the beauty parameter may be adaptively selected according to the shooting distance, such that a beauty effect may be improved and a better visual display effect on the image may be achieved.

In an embodiment, the distance acquisition module 1020 may include a proportion calculation unit and a distance acquisition unit.

The proportion calculation unit may be configured to acquire a face region of the portrait and calculate a proportion of the face region in the image to be processed.

The distance acquisition unit may be configured to acquire the shooting distance corresponding to the proportion according to a preset corresponding relationship.

In the embodiment, the shooting distance of the portrait may be acquired according to the proportion of the face region in the image to be processed, so that the shooting distance may be accurately acquired to facilitate subsequent adaptive selection of the beauty parameter according to the shooting distance. Therefore, the beauty effect may be improved, and the better visual display effect on the image may be achieved.

In an embodiment, the distance acquisition module 1020 may include a distance acquisition unit, a distance calculation unit and a determination unit.

The distance acquisition unit may be configured to acquire distance information of the image to be processed. The distance information may indicate a distance between each object in the image to be processed and the electronic device.

The distance calculation unit may be configured to calculate an average distance of the face region of the portrait according to the distance information.

The determination unit may be configured to determine the shooting distance of the portrait according to the average distance.

In the embodiment, the shooting distance of the portrait may be determined according to the distance information of the image to be processed to facilitate subsequent adaptive selection of the beauty parameter according to the shooting distance. Therefore, the beauty effect may be improved, and the better visual display effect on the image may be achieved.

In an embodiment, the parameter selection module 1040 may further be configured to, responsive to determining that the shooting distance is smaller than a first distance threshold, acquire a parameter relationship including a positive correlation between shooting distances and beauty parameters, and responsive to determining that the shooting distance is larger than a second distance threshold, acquire a parameter relationship including a negative correlation between shooting distances and beauty parameters.

In at least one embodiment, besides the recognition module 1010, the distance acquisition module 1020, the relationship acquisition module 1030, the parameter selection module 1040 and the processing module 1050, the image processing device 1000 further includes a threshold determination module.

The threshold determination module may be configured to acquire focal length information of a camera for acquiring the image to be processed and determine the first distance threshold and the second distance threshold according to the focal length information.

In the embodiment, the beauty parameter corresponding to the shooting distance may be selected according to the parameter relationship matched with the met distance condition, so that the beauty parameter may be adaptively selected according to the shooting distance, such that a beauty effect may be improved and a better visual display effect on the image may be achieved.

In an embodiment, besides the recognition module 1010, the distance acquisition module 1020, the relationship acquisition module 1030, the parameter selection module 1040, the processing module 1050 and the threshold determination module, the image processing device 1000 further includes: a sharpening module, configured to, responsive to determining that the shooting distance meets the preset distance condition, acquire an enhancement coefficient corresponding to the shooting distance and perform sharpening processing on the portrait according to the enhancement coefficient.

In the embodiment, when the shooting distance of the portrait in the image to be processed meets the preset distance condition, sharpening processing may be performed on the portrait to make the portrait in the image sharper, so that the visual display effect of the image is improved.

Figure 11:
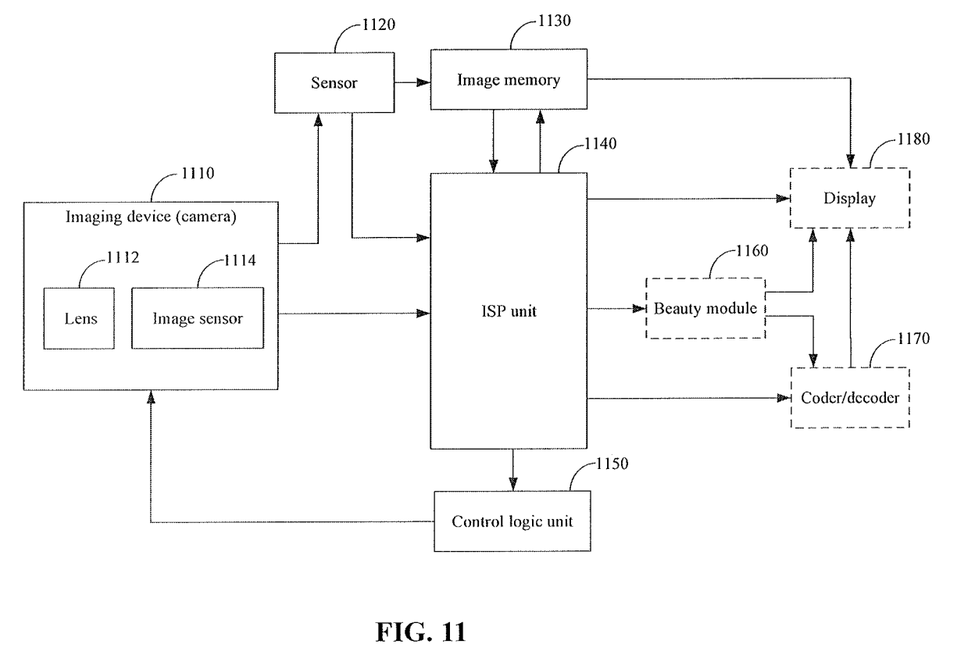
FIG. 11 is a schematic diagram of an image processing circuit according to an embodiment of the disclosure.

The embodiments of the disclosure further provide an electronic device. The electronic device includes an image processing circuit. The image processing circuit may be implemented by virtue of hardware and/or software components and may include various processing units for defining Image Signal Processing (ISP) pipelines. FIG. 11 is a schematic diagram of an image processing circuit according to an embodiment of the disclosure. As illustrated in FIG. 11, each aspect of an image processing technology related to the embodiments of the disclosure is illustrated only, for convenient description.

As illustrated in FIG. 11, the image processing circuit includes an ISP unit 1140 and a control logic unit 1150. Image data captured by an imaging device 1110 is processed by the ISP unit 1140 at first, and the ISP unit 1140 analyzes the image data to capture image statistical information, the image statistical information being available for determining one or more control parameters of the ISP unit 1140 and/or the imaging device 1110. The imaging device 1110 may include a camera with one or more lenses 1112 and an image sensor 1114. The image sensor 1114 may include a array of color filters (for example, a Bayer filter). The image sensor 1114 may acquire light intensity and wavelength information captured by each imaging pixel of the image sensor 1114 and provide a set of original image data that may be processed by the ISP unit 1140. A sensor 1120 (for example, a gyroscope) may provide a parameter (for example, a stabilization parameter) for processing of an acquired image to the ISP unit 1140 based on an interface type of the sensor 1120. An interface of the sensor 1120 may adopt a Standard Mobile Imaging Architecture (SMIA) interface, other serial or parallel camera interface or a combination thereof.

In addition, the image sensor 1114 may also send the original image data to the sensor 1120. The sensor 1120 may provide the original image data to the ISP unit 1140 based on the interface type of the sensor 1120, or the sensor 1120 stores the original image data in an image memory 1130.

The ISP unit 1140 processes the original image data pixel by pixel in various formats. For example, each image pixel may have a bit depth of 8, 10, 12 or 14 bits. The ISP unit 1140 may perform one or more image processing operations on the original image data and collect statistical information about the image data. The image processing operations may be executed according to the same or different bit depth accuracy.

The ISP unit 1140 may further receive the image data from the image memory 1130. For example, the interface of the sensor 1120 sends the original image data to the image memory 1130, and the original image data in the image memory 1130 is provided to the ISP unit 1140 for processing. The image memory 1130 may be a part of a memory device, storage equipment or an independent dedicated memory in the electronic device, and may include a Direct Memory Access (DMA) feature.

When receiving the original image data from an interface of the image sensor 1114 or from the interface of the sensor 1120 or from the image memory 1130, the ISP unit 1140 may perform one or more image processing operations, for example, time-domain filtering. The processed image data may be sent to the image memory 1130 for performing other processing before displaying. The ISP unit 1140 may further receive the processed data from the image memory 1130 and perform image data processing in an original domain and color spaces of RGB and YCbCr on the processed data. The processed image data may be output to a display 1180 for a user to view and/or for other processing by a Graphics Processing Unit (GPU). In addition, output of the ISP unit 1140 may further be sent to the image memory 1130, and the display 1180 may read the image data from the image memory 1130. In an embodiment, the image memory 1130 may be configured to implement one or more frame buffers. Moreover, the output of the ISP unit 1140 may be sent to a coder/decoder 1170 to code/decode the image data. The coded image data may be stored, and may be decompressed before being displayed on the display 1180.

The operation that the ISP 1140 processes the image data includes that: Video Front End (VFE) processing and Camera Post Processing (CPP) are performed on the image data. The VFE processing on the image data may include correction of a contrast or brightness of the image data, modification of illumination state data recorded in a digital manner, compensation processing (for example, white balance, automatic gain control and γ correction) on the image data, filtering processing on the image data and the like. The CPP on the image data may include scaling of the image and provision of a preview frame and a recording frame for each path. In the example, the CPP may process the preview frame and the recording frame with different codecs.

The image data processed by the ISP unit 1140 may be sent to a beauty module 1160 for beauty processing on the image before being displayed. The beauty processing performed by the beauty module 1160 on the image data may include whitening, freckle removing, filtering, face-lift, acne removing, eye widening and the like. The beauty module 1160 may be a Central Processing Unit (CPU), GPU, coprocessor or the like in the electronic device. The data processed by the beauty module 1160 may be sent to the coder/decoder 1170 for coding/decoding the image data. The coded image data may be stored, and may be decompressed before being displayed on the display 1180. The beauty module 1160 may also be positioned between the coder/decoder 1170 and the display 1180, that is, the beauty module performs beauty processing on the image that has been imaged. The coder/decoder 1170 may be the CPU, GPU, coprocessor or the like in the electronic device.

Statistical data determined by the ISP unit 1140 may be sent to the control logic unit 1150. For example, the statistical data may include statistical information about automatic exposure, automatic white balance, automatic focusing, scintillation detection, black level compensation, shading correction of the lens 1112 and the like of the image sensor 1114. The control logic unit 1150 may include a processor and/or microcontroller for executing one or more routines (for example, firmware), and the one or more routines may determine control parameters of the imaging device 1110 and control parameters of the ISP unit 1140 according to the received statistical data. For example, the control parameter of the imaging device 1110 may include control parameters (for example, integral time for gain and exposure control) for the sensor 1120, a camera scintillation control parameter, a control parameter (for example, a focal length for focusing or zooming) for the lens 1112 or a combination of these parameters. The control parameters for the ISP unit may include a gain level and color correction matrix for automatic white balance and color regulation (for example, during RGB processing) and a shading correction parameter for the lens 1112.

In the embodiment, the abovementioned image processing method may be implemented by use of the image processing technology in FIG. 11.

In an embodiment, an electronic device is provided. The electronic device includes a memory and a processor. The memory stores a computer program that, when executed by the processor, causes the processor to execute the following operations. Face recognition is performed on an image to be processed. Responsive to detecting that the image to be processed includes a portrait, a shooting distance of the portrait is acquired. Responsive to determining that the shooting distance meets a preset distance condition, a parameter relationship matched with the met distance condition is acquired. A beauty parameter corresponding to the shooting distance is selected according to the parameter relationship and beauty processing is performed on the portrait according to the beauty parameter.

In an embodiment, the operation, executed by the processor, that the shooting distance of the portrait is acquired may include that: a face region of the portrait is acquired, and a proportion of the face region in the image to be processed is calculated; and the shooting distance corresponding to the calculated proportion is acquired according to a preset corresponding relationship between proportions of the face region and shooting distances.

In an embodiment, the operation, executed by the processor, that the shooting distance of the portrait is acquired may include that the shooting distance of the portrait is acquired through a distance sensor.

In an embodiment, the operation, executed by the processor, that the shooting distance of the portrait is acquired may include that: distance information of the image to be processed is acquired; an average distance of the face region of the portrait is calculated according to the distance information; and the shooting distance of the portrait is determined according to the average distance.

In an embodiment, the method executed by the processor may include the following operations. Responsive to determining that the shooting distance meets the preset distance condition, an enhancement coefficient corresponding to the shooting distance is acquired. Sharpening processing is performed on the portrait according to the enhancement coefficient.

In an embodiment, the operation, executed by the processor, that the parameter relationship matched with the met distance condition is acquired responsive to determining that the shooting distance meets the preset distance condition may include that: responsive to determining that the shooting distance is smaller than a first distance threshold, a parameter relationship comprising a positive correlation between shooting distances and beauty parameters is acquired; and responsive to determining that the shooting distance is larger than a second distance threshold, a parameter relationship comprising a negative correlation between shooting distances and beauty parameters is acquired. The first distance threshold may be less than the second distance threshold.

In an embodiment, the method executed by the processor may include the following operations. Before the parameter relationship matched with the met distance condition is acquired responsive to determining that the shooting distance meets the preset distance condition, focal length information of a camera for acquiring the image to be processed is acquired, and the first distance threshold and the second distance threshold are determined according to the focal length information.

In an embodiment, in the method executed by the processor, the beauty parameter may include at least one of the following: a whitening parameter, a filtering parameter, an eye widening parameter or a face-lift parameter.

In an embodiment, the operation, executed by the processor, that performing face recognition on an image to be processed may include that: an image feature of the image to be processed is extracted; the image feature is analyzed through a preset face recognition model to determine whether the image to be processed includes a face; and responsive to determining that the image to be processed includes a face, it is determined that the image to be processed includes the portrait. The image feature may include at least one of a shape feature, a spatial feature or an edge feature.

In an embodiment, the method executed by the processor may include the following operations. After the proportion of the face region in the image to be processed is calculated, focal length information of the camera for acquiring the image to be processed is acquired. A corresponding relationship matched with the focal length information is acquired and the shooting distance corresponding to the calculated proportion is acquired according to the matched corresponding relationship.

In an embodiment, a computer-readable storage medium is provided, on which a computer program is stored. The computer program is executed by a processor to implement the abovementioned image processing method.

In an embodiment, a computer program product including a computer program is provided. The computer program product runs on an electronic device to cause the electronic device to implement the abovementioned image processing method.

Those of ordinary skilled in the art may understand that all or part of the flow in the method of the abovementioned embodiments may be completed by related hardware that is instructed by a computer program. The computer program may be stored in a nonvolatile computer-readable storage medium, and when the program is executed, the process of each method embodiment may be included. In the example, the storage medium may be a magnetic disk, an optical disk, a Read-Only Memory (ROM) and the like.

Any memory, storage, a database or another medium used herein may include nonvolatile and/or nonvolatile memories. A proper nonvolatile memory may include a ROM, a Programmable ROM (PROM), an Electrically Programmable ROM (EPROM), an Electrically Erasable Programmable ROM (EEPROM) or a flash memory. The volatile memory may include a Random Access Memory (RAM), and is used as an external high-speed buffer memory. Exemplarily but unlimitedly, the RAM may be obtained in various forms, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), a Rambus Direct RAM (RDRAM), a Direct RDRAM (DRDRAM) and a Rambus Dynamic RAM (RDRAM).

Each technical feature of the abovementioned embodiments may be freely combined. For brief description, not all possible combinations of technical feature in the abovementioned embodiments are described. However, any combination of these technical features shall fall within the scope of the disclosure as long as without conflicts in these combinations.

The abovementioned embodiments only describes some implementation modes of the disclosure and are specifically described in detail, but it should not be understood as limits to the scope of the disclosure. It should be pointed out that those of ordinary skilled in the art may further make a plurality of transformations and improvements without departing from the concept of the disclosure and all of these fall within the scope of protection of the disclosure. Therefore, the scope of protection of the patent disclosure should be subject to the appended claims.

The invention claimed is:

1. An image processing method, comprising:
performing face recognition on an image to be processed;
responsive to detecting that the image to be processed comprises a portrait, acquiring a shooting distance of the portrait;
responsive to determining that the shooting distance meets a preset distance condition, acquiring a parameter relationship matched with the met distance condition;
selecting a beauty parameter corresponding to the shooting distance according to the parameter relationship; and performing beauty processing on the portrait according to the beauty parameter, wherein acquiring the parameter relationship matched with the met distance condition responsive to determining that the shooting distance meets the preset distance condition comprises:

responsive to determining that the shooting distance is smaller than a first distance threshold, acquiring a parameter relationship comprising a positive correlation between shooting distances and beauty parameters; and responsive to determining that the shooting distance is larger than a second distance threshold, acquiring a parameter relationship comprising a negative correlation between shooting distances and beauty parameters;

wherein the first distance threshold is less than the second distance threshold.

2. The method according to claim 1, wherein acquiring the shooting distance of the portrait comprises:

acquiring a face region of the portrait, and calculating a proportion of the face region in the image to be processed; and acquiring the shooting distance corresponding to the calculated proportion according to a preset corresponding relationship between proportions of the face region and shooting distances.

3. The method according to claim 1, wherein acquiring the shooting distance of the portrait comprises: acquiring the shooting distance of the portrait through a distance sensor.

4. The method according to claim 1, wherein acquiring the shooting distance of the portrait comprises:

acquiring distance information of the image to be processed;

calculating an average distance of the face region of the portrait according to the distance information; and determining the shooting distance of the portrait according to the average distance.

5. The method according to claim 1, further comprising:

responsive to determining that the shooting distance meets the preset distance condition, acquiring an enhancement coefficient corresponding to the shooting distance; and performing sharpening processing on the portrait according to the enhancement coefficient.

6. The method according to claim 1, before acquiring the parameter relationship matched with the met distance condition responsive to determining that the shooting distance meets the preset distance condition, further comprising:

acquiring focal length information of a camera for acquiring the image to be processed, and determining the first distance threshold and the second distance threshold according to the focal length information.

7. The method according to claim 1, wherein the beauty parameter comprises at least one of the following: a whitening parameter, a filtering parameter, an eye widening parameter or a face-lift parameter.

8. The method according to claim 1, wherein performing face recognition on an image to be processed comprises:

extracting an image feature of the image to be processed;

analyzing the image feature through a preset face recognition model to determine whether the image to be processed includes a face;

responsive to determining that the image to be processed includes a face, determining that the image to be processed includes the portrait;

wherein the image feature comprises at least one of a shape feature, a spatial feature or an edge feature.

9. An electronic device, comprising a memory and a processor, the memory storing a computer program that, when executed by the processor, causes the processor to implement an image processing method, the method comprising:

performing face recognition on an image to be processed;

responsive to detecting that the image to be processed comprises a portrait, acquiring a shooting distance of the portrait;

responsive to determining that the shooting distance meets a preset distance condition, acquiring a parameter relationship matched with the met distance condition;

selecting a beauty parameter corresponding to the shooting distance according to the parameter relationship; and performing beauty processing on the portrait according to the beauty parameter, wherein acquiring the parameter relationship matched with the met distance condition responsive to determining that the shooting distance meets the preset distance condition comprises:

responsive to determining that the shooting distance is smaller than a first distance threshold, acquiring a parameter relationship comprising a positive correlation between shooting distances and beauty parameters; and responsive to determining that the shooting distance is larger than a second distance threshold, acquiring a parameter relationship comprising a negative correlation between shooting distances and beauty parameters;

wherein the first distance threshold is less than the second distance threshold.

10. The electronic device according to claim 9, wherein acquiring the shooting distance of the portrait comprises:

acquiring a face region of the portrait, and calculating a proportion of the face region in the image to be processed; and acquiring the shooting distance corresponding to the calculated proportion according to a preset corresponding relationship between proportions of the face region and shooting distances.

11. The electronic device according to claim 9, wherein acquiring the shooting distance of the portrait comprises: acquiring the shooting distance of the portrait through a distance sensor.

12. The electronic device according to claim 9, wherein acquiring the shooting distance of the portrait comprises:

acquiring distance information of the image to be processed;

calculating an average distance of the face region of the portrait according to the distance information; and determining the shooting distance of the portrait according to the average distance.

13. The electronic device according to claim 9, wherein the method further comprises:

responsive to determining that the shooting distance meets the preset distance condition, acquiring an enhancement coefficient corresponding to the shooting distance; and performing sharpening processing on the portrait according to the enhancement coefficient.

14. The electronic device according to claim 9, wherein the method further comprises: before acquiring the parameter relationship matched with the met distance condition responsive to determining that the shooting distance meets the preset distance condition, acquiring focal length information of a camera for acquiring the image to be processed, and determining the first distance threshold and the second distance threshold according to the focal length information.

15. The electronic device according to claim 9, wherein the beauty parameter comprises at least one of the following: a whitening parameter, a filtering parameter, an eye widening parameter or a face-lift parameter.

16. The electronic device according to claim 9, wherein performing face recognition on an image to be processed comprises:
   extracting an image feature of the image to be processed;
   analyzing the image feature through a preset face recognition model to determine whether the image to be processed includes a face;
   responsive to determining that the image to be processed includes a face, determining that the image to be processed includes the portrait;
   wherein the image feature comprises at least one of a shape feature, a spatial feature or an edge feature.

17. The electronic device according to claim 10, wherein the method further comprises: after calculating the proportion of the face region in the image to be processed,
   acquiring focal length information of a camera for acquiring the image to be processed;
   acquiring a corresponding relationship matched with the focal length information; and
   acquiring the shooting distance corresponding to the calculated proportion according to the matched corresponding relationship.

18. A non-transitory computer-readable storage medium, storing a computer program thereon, wherein the computer program is executed by a processor to implement an image processing method, the method comprising:
   performing face recognition on an image to be processed;
   responsive to detecting that the image to be processed comprises a portrait, acquiring a shooting distance of the portrait;
   responsive to determining that the shooting distance meets a preset distance condition, acquiring a parameter relationship matched with the met distance condition;
   selecting a beauty parameter corresponding to the shooting distance according to the parameter relationship; and
   performing beauty processing on the portrait according to the beauty parameter,
   wherein acquiring the parameter relationship matched with the met distance condition responsive to determining that the shooting distance meets the preset distance condition comprises:
   responsive to determining that the shooting distance is smaller than a first distance threshold, acquiring a parameter relationship comprising a positive correlation between shooting distances and beauty parameters; and
   responsive to determining that the shooting distance is larger than a second distance threshold, acquiring a parameter relationship comprising a negative correlation between shooting distances and beauty parameters;
   wherein the first distance threshold is less than the second distance threshold.

* * * * *